Jan. 12, 1943.   F. L. EIDMANN ET AL   2,307,999
TIME-MEASURING INSTRUMENT
Filed April 26, 1939   3 Sheets-Sheet 1

INVENTORS.
Frank L. Eidmann
BY George C. Engel
ATTORNEY.

Jan. 12, 1943. F. L. EIDMANN ET AL 2,307,999
TIME-MEASURING INSTRUMENT
Filed April 26, 1939 3 Sheets-Sheet 2

INVENTORS.
Frank L. Eidmann
George C. Engel
BY
ATTORNEY.

Jan. 12, 1943.  F. L. EIDMANN ET AL  2,307,999
TIME-MEASURING INSTRUMENT
Filed April 26, 1939    3 Sheets-Sheet 3

INVENTORS.
Frank L. Eidmann
George C. Engel
BY
ATTORNEY.

Patented Jan. 12, 1943

2,307,999

UNITED STATES PATENT OFFICE 2,307,999

TIME MEASURING INSTRUMENT

Frank L. Eidmann, Princeton, and George C. Engel, Ridgewood, N. J., assignors to General Time Instruments Corporation, New York, N. Y., a corporation of Delaware Application April 26, 1939, Serial No. 270,062

7 Claims. (Cl. 194—45)

This invention relates to improvements in time measuring instruments and in particular to mechanism which is adapted to measure a predetermined interval of time after the expiration of which the mechanism is inoperative.

The principal object of our invention is to provide a time measuring mechanism which is suitabel for use in parking meters.

A further object is to provide a timing mechanism which is fully automatic, that is one which does not require manual resetting nor manual winding each time that it is operated.

A further object is to provide a parking meter in which the time responsive driving means functions only during the time interval which is to be measured.

A further object is to provide a spring driven parking meter, the spring of which will need winding only at infrequent intervals.

A further object is to provide a coin operated parking meter which cannot be operated by undersized or oversized coins and which exposes to the public view the last inserted coin which has caused or is causing operation of the meter.

A further object is to provide a parking meter which indicates the unexpired parking time and which is provided with a secondary signal to indicate more clearly the expiration of a measured period.

A further object is to provide a parking meter having improved coin receiving and coin escapement means.

A further object is to provide a time measuring instrument suitable for use as a parking meter which can be locked in a tamper-proof casing and which does not need to be manually operated or wound by the parking patron.

Other objects, features and advantages of our invention will become apparent from the following description.

The timing mechanism shown in the figures is adapted for use as a parking meter, in which event it is provided with certain additional elements not shown nor described herein, such as a suitable standard, a coin receptacle, a weatherproof housing, and a lock therefor to prevent unauthorized access to the coin receptacle and the timing mechanism. The housing may be provided with windows on either side through which the scale and indicating hand may be visible, and also with a window for exposing the actuating coin.

Figures 1, 2, 3:
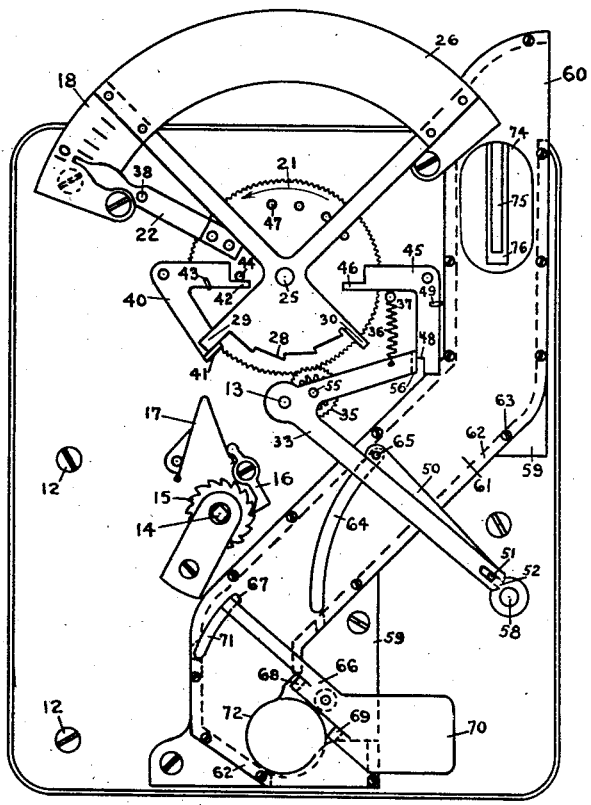
Figure 1 is a front elevation of a preferred embodiment of my invention.
Figure 2 is a side elevation of Figure 1.
Figure 3 is a rear elevation of the same embodiment, the lower portion being broken away.

Referring now to Figures 1, 2 and 3, reference numerals 10 and 11 indicate box-like housing members which are telescoped together to form a dust-tight enclosure for the clockwork or driving mechanism of the parking meter upon which the meter mechanism is mounted. The clockwork may be secured within the housing members by means of studs 12. Shaft 13 extends from the clockwork through the front plate and is adapted to be rotated by the clockwork at any suitable speed such as one revolution per hour. Winding shaft 14 extends from the clockwork through the front housing member and has associated therewith the usual ratchet 15 and pawl 16, the pawl being biased by spring 17 against the ratchet to prevent the main spring of the clockwork from unwinding. An arcuate clock dial 18 is mounted on the front housing member and a similar dial 19 is mounted on the rear housing member. A hollow shaft 20 is journaled in the housing members and has affixed to it, adjacent the front housing member, wheel 21, which may be knurled or provided with a large number of very small teeth. An indicator hand 22 is affixed to the wheel and cooperates with dial 18 so that as the wheel is rotated the hand will indicate the number of minutes remaining before expiration of the parking period. An indicator hand 23 is affixed to the shaft 20 and cooperates with the rear dial 19. There is also affixed to the same shaft, adjacent the rear housing member, a counterweight 24. In the position of the hands 22 and 23, which is shown in Figures 1 and 3, the counterweight 24 is elevated so that if the wheel 21 is free to rotate, the hands will be moved toward the starting position at the other extremity of the dials.

A small shaft 25 extends through the hollow shaft 20 and at the front end thereof has a shield 26 affixed thereto. Associated with the shield is a ratchet 28 provided with stops 29 and 30 at either end thereof, this ratchet extending through an arc of approximately ninety degrees. The stops are adapted to cooperate with a suitable member such as pawl 41 to limit the rotation of the shield. A similar target 27 is affixed to shaft 25, adjacent the rear housing member, the shaft at this end also being provided with a counterweight 31 which causes the shield to assume the position shown in Figures 1 and 3. If shield 26 is displaced in the clockwise direction as shown in Figure 5, the counterweight will cause it to swing back to the position shown in Figure 1 as soon as the pawl 41 is released from the ratchet 28.

Figure 4:
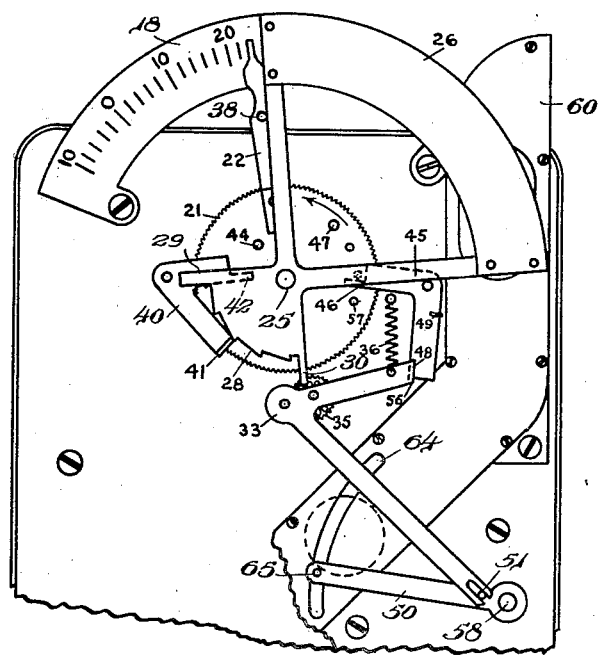
Figure 4 is a front elevation similar to Figure 1 but showing the mechanism just after the coin has been inserted and dropped to the position indicated.
Figure 5:
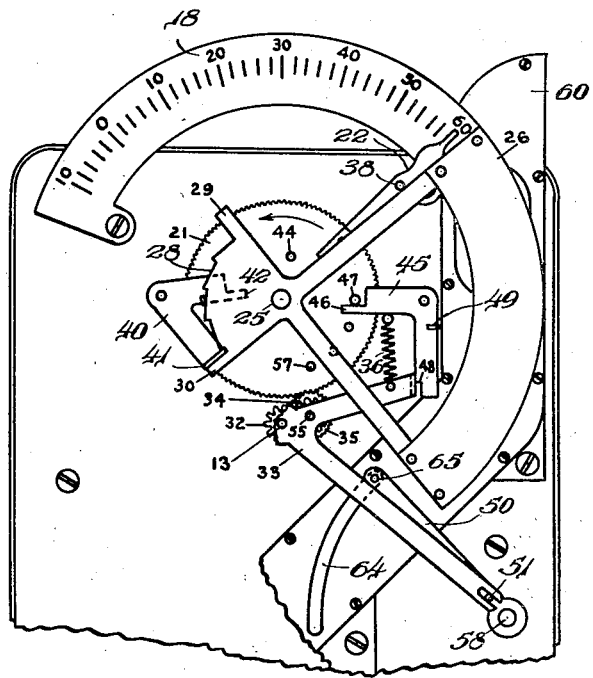
Figure 5 is a front elevation similar to Figure 1 but showing the mechanism during the stage of its operation immediately subsequent to that shown in Figure 4, the bottom portion of the latter two figures being broken away.

A pinion 32 is affixed to shaft 13 as indicated in Figure 5 and exteriorly thereof a bell crank lever 33 is journaled on the shaft for rotation with respect thereto. One arm of the bell crank lever is provided with a pinion 34 and a small knurled wheel or fine tooth pinion 35 which are non-rotatably affixed to each other and journaled on stud 55, the pinion 34 meshing with pinion 32 so that when the bell crank lever is in the position shown in Figures 1 and 5 the clockwork will drive the wheel 21 in a counterclockwise direction as indicated by the arrow. If the bell crank lever is rotated as shown in Figure 4 in the clockwise direction the pinion 35 will be disengaged from the gear 21 so that the latter may move freely under the influence of counterweight 24. A spring 36, one end of which is affixed to a pin 37 mounted on the front housing member biases the bell crank lever in the counterclockwise direction so that the two wheels 21 and 35 are normally in engagement with each other. A pin 38 is located on the indicator hand 22 in such a manner as to engage the shield 26 when the indicator hand is rotated in the clockwise direction by the counterweight 24. Counterweight 24 is heavier than counterweight 31 so that as shield 26 is rotated in the clockwise direction by the pin on the indicator hand, the counterweight 31 is elevated.

A bell crank lever 40 is rotatably mounted on the front housing member at the left of the wheel 21, one arm of the bell crank having a turned up end 41 which serves as a pawl to engage ratchet 28 to hold the shield in a displaced position and to hold the counterweight 31 in an elevated position after displacement thereof by the indicator hand. Spring 43 on the bell crank lever urges the pawl into engagement with the ratchet. The other arm of the bell crank lever terminates in a projection 42 which extends into the path of a pin 44 which is mounted on knurled wheel 21. As the wheel 21 is rotated by the clockwork into the position shown in Figure 1 it will be seen that the pin 44 displaces the bell crank lever 40 in opposition to spring 43 in such a manner that the pawl 41 is disengaged from the ratchet 28 allowing the shield 26 to move to the left. A bell crank lever 45 is pivoted on the front housing at the right of the wheel 21, one arm of which has the projection 46 which extends out into the path of a pin 47 suitably positioned on the wheel. The lower arm of the bell crank lever has a shoulder 48 formed thereon which acts as a detent which engages the bent-over end 56 of bell crank lever 33. The spring 49 urges the bell crank 45 in the clockwise direction so that the detent will engage the bent-over end 56 when the bell crank lever 33 is rotated downwardly, and when the knurled wheel 21 has rotated sufficiently far to the right so that the pin 47 releases the detent, the spring 36 will cause the two wheels 21 and 35 to engage each other. The lever 50 is mounted on a shaft 58 and is biased upwardly by suitable means, the lever having a pin 51 formed on it so that the side of a slot 52 at the end of one arm of the bell crank lever 33 may engage the pin. Displacement of lever 50 from the position shown will cause rotation of the bell crank lever. Shaft 58 may be journaled in the front housing member, or it may comprise the shaft of a counter 53 which may be mounted on the housing member to register the number of operations of lever 50.

Figure 6:
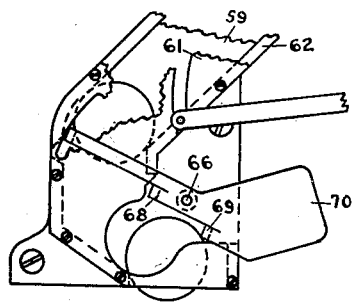
Figure 6 is an elevation of the coin exposing and escapement mechanism during a stage of its operation wherein the escapement is being actuated by a falling coin.
Figure 7:
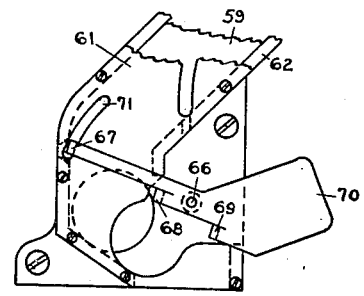
Figure 7 is an elevation similar to Figure 6 but shown during a slightly later stage in the operation of the escapement mechanism.

A coin chute 60 is formed by plate 61 which is separated from a base plate 59, mounted on the front housing member, by spacing member 62 and secured thereto by screws 63, the plate 61 having an arcuate slot 64 formed therein through which a pin 65 on lever 50 may extend, the end of the pin being in the path of a coin which is dropped through the chute so that lever 50 will be actuated by the falling coin to operate the mechanism. Toward the lower end of the coin chute a pivoted member 66 is located on the front housing member, this pivoted member having three inwardly turned projections 67, 68 and 69 and a counterweight 70. A slot 71 is formed on plate 61 through which the projection 67 extends so that a coin dropping through the chute will rotate the pivoted member 66. As shown in Figure 1 a previously inserted coin is visible through an aperture 72 on plate 61, the coin resting on the spacing member 62 and being held in position by projection 69 of the pivoted member 66. When a falling coin displaces the pivoted member 66 as shown in Figure 6 the projection 69 releases the previously inserted coin which is allowed to drop out of the bottom of the coin chute into a suitable receptacle, the projection 68 at the same time blocking the entering or actuating coin so that it may not follow the previously inserted coin into the receptacle while the projection 69 is displaced. As soon as the counterweight 70 has caused the pivoted member to return to normal position the projection 68 is withdrawn from engagement with the actuating coin and the coin drops down to the position shown in Figure 1 where it is held in place by projection 69.

An aperture 74 is formed on the plate 61 near the top of the coin chute, and the base plate 59 as shown at 76 in Figure 1 is cut away or recessed so that a coin reject lever 75 which is pivoted on the front housing member at 78 may be displaced by a falling coin into the cut away or recessed portion 76. A counterweight 77 is associated with the reject lever 75 so that normally the position of this lever is as shown in Figure 2. If a coin of slightly less diameter than the coins which are intended to operate the machine is inserted in the coin chute, the reject lever will cause it to be thrown out of the chute through aperture 74. A coin of the correct diameter, however, cannot pass through the aperture and will continue its course through the coin chute to operate the timing mechanism.

Figure 8:
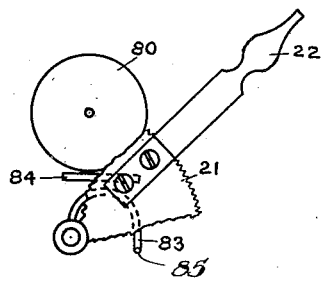
Figure 8 is a detail showing the braking mechanism for the balance wheel.
Figure 9:
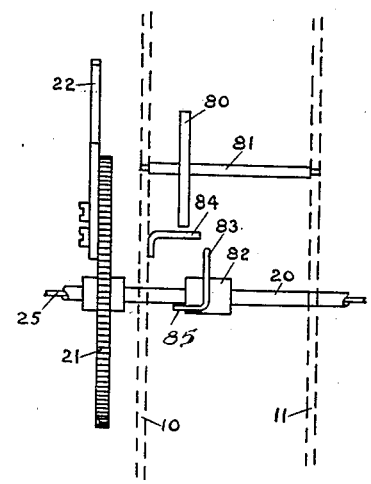
Figure 9 is a detailed side elevation of the mechanism shown in Figure 8.

The clockwork is wholly enclosed within housing members 10 and 11 to afford additional protection against dust and to prevent damage to the clockwork if the meter is opened. As the clockwork itself forms no part of my invention, it is not shown or described herein except for the balance wheel 80 which cooperates with the braking mechanism for automatically stopping the clockwork at the end of the measured interval. The braking mechanism and the balance wheel are shown in Figures 8 and 9 in which other details are omitted for the sake of clarity, the dotted lines in Figure 9 representing the usual front and rear plates of the clockwork in which the balance wheel staff 81 may be journaled, and which are here shown to be coincidental with housing members 10 and 11, although in practice it may be more convenient to use a slightly different arrangement.

Non-rotatably affixed to hollow shaft 20 is a collar 82 from which extends a wiper 83 in the form of a resilient U-shaped member the free end of which is bent over at 85 so that it may engage the periphery of the balance wheel. A plate 84 which is affixed to and extends inwardly from housing member 10 is so positioned that as the indicator hand 22 is rotated in the counterclockwise direction, the laterally extending portion 85 of the wiper will slide along the underside of the plate. At a predetermined point in the course of rotation of the hand, the end 85 of the wiper will slide from under the left end of the plate 84 as seen in Figure 8, the U-shaped portion having been compressed during said rotation, and will snap into engagement with the balance wheel, thereby stopping the clockwork. When the hand 22 is rotated in the clockwise rotation, the extension 85 of the wiper will slide along the upper surface of plate 84 and will drag along with it the balance wheel, giving it sufficient kick to set the clockwork again in motion.

If a synchronous motor, rather than clockwork be provided to drive the hand, the rotation of shaft 20 may be employed to actuate a switch for the motor. If preferred, the rotation of bell crank lever 40 beyond a predetermined position may be employed to produce the same result.

With regard to the operation of my invention, Figures 1 and 3 show the parking meter at a time when the clockwork is inoperative, due to the contact of wiper 83 against the balance wheel 80. If a coin be inserted in the coin chute 60 which is of smaller diameter than that coin, such as a five-cent piece, by which it is desired to cause the operation of the meter, the coin reject lever 75 will force the coin through aperture 74 so that the meter cannot be operated thereby. The entrance to the coin chute is of such size as to prevent the insertion of coins of larger diameter than those desired. If the correct type of coin be used, however, it will not pass through aperture 74, but will continue through the coin chute, forcing the counterweighted coin reject lever 75 into the recessed portion 76 of base plate 59. As the coin strikes pin 65, the wheel 21 will be disconnected from the clockwork, permitting the wheel and hand 22 to move in the clockwise direction under the influence of counterweight 24, the pin 38 on the hand causing shield 26 to move with it and the pawl 41 riding over ratchet 28.

Figure 4 shows the apparatus at this stage of its operation the hand being about half way to the starting position. As the bell crank lever 33 is rotated by the falling coin in opposition to spring 36, the spring 49 causes shoulder 48 of bell crank 45 to engage the projection 56 and to hold the bell crank lever 33 in displaced position.

The clockwise rotation of the hand and wheel 21 continues until pin 47 engages stop 46 which constitutes one arm of bell crank lever 45. This engagement rotates the bell crank lever 45 and causes detent 48 to release bell crank lever 33 from its displaced position, permitting the pinion 35 to engage the wheel 21 and to rotate it in the counterclockwise direction, the clockwork having been started by the action of the wiper 83 on the balance wheel during the clockwise rotation of wheel 21 and hand 22. The pawl 41 permits the clockwise rotation of shield 26, but when the hand reaches the starting position, in this instance indicated by the numeral "60" on dial 18, and reverses the direction of its rotation, the pawl 41 cooperating with ratchet 28 maintains the shield in the starting position. Figure 5 illustrates the mechanism in the position wherein the engagement of pin 47 with stop 46 has just released detent 48. The hand indicates that 60 minutes are available before expiration of the parking period.

It will be noted that a plurality of tapped holes 57 are provided on wheel 21 into any one of which threaded pin 47 is adapted to be inserted to change the starting position of the hand 22 and consequently the length of the parking period. If, for instance, pin 47 is inserted in the position adjacent to the sixty minute position shown in the figures, the pin 47 will engage stop 46 at the 45 minute position on the dial 18 and detent 48 will be released at that point, causing engagement of the clockwork with gear wheel 21 at that position. Thus the parking period may readily be changed.

As the hand 22 is driven toward the zero position on the scale, the pin 44 will come into engagement with projection 42, and at the zero position, the projection 42 and bell crank lever 40 will be displaced sufficiently to disengage pawl 41 from ratchet 28. The counterweight 31 will then cause rotation of the shields 26 and 27 to a position wherein stop 29 engages pawl 41, in which position the shield covers that portion of the scale to the right of the zero point. This position of the shield indicates that the parking period has expired, and the mechanism is so arranged that a few minutes of overparking may be measured beyond the time paid for which feature materially aids in the settlement of disputes concerning the extent of overparking, which may arise in enforcing overparking regulations.

As the hand 22 approaches the negative "10" position on the scale, the extension 85 of wiper 83 approaches the left hand edge of plate 84, and at that position, the wiper will slip past the end of the plate into engagement with the balance wheel 80, whereby stopping the clockwork and conserving the energy of the mainspring.

Inasmuch as the clockwork is operative only in response to the deposit of a coin, the tension of the mainspring will roughly be a function of the number of coins deposited. Therefore, instead of having to wind the mainspring of all the meters, irrespectively of the extent to which they are used, at predetermined regular intervals, any meter or group of meters need be wound at intervals determined by the extent of their use, which is indicated by a simple inspection of the coin counter 53 for any particular meter.

It is understoood that various changes and modifications may be made in the timing mechanism shown and described herein without departing from the spirit of our invention as defined by the following claims.

We claim:

1. A coin controlled parking meter comprising time responsive driving means, a scale, a rotatable indicator hand for cooperation with said scale, means for biasing said hand to one extreme position, said time responsive driving means normally engaging said hand to displace the same in opposition to said biasing means, means actuated by a falling coin to disengage said driving means from said hand, a detent to maintain said last named means in coin actuated position thereby permitting said hand to rotate to said extreme position, means actuated upon the rotation of said hand into said extreme position to release said detent whereby said driving means may again engage said hand and displace the same, and means for rendering said driving means inoperative at a predetermined length of time after the release of said detent whereby said hand is maintained in displaced position until again released by said coin actuated means.

2. A timing mechanism comprising time responsive driving means normally inoperative and adapted to be operative for a predetermined length of time, an indicator normally engaged by said driving means and adapted to be driven from a starting position to a predetermined displaced position and to be maintained in said displaced position during such time that said driving means is inoperative, means for simultaneously disengaging said indicator from said driving means and for initiating the operation of said driving means, means for returning said indicator to said starting position, and means for causing said disengaging means to reengage said indicator and said driving means when said indicator has been returned to said starting position.

3. A coin operated parking meter comprising normally inoperative time responsive driving means, a coin chute, a rotatable indicator biased toward starting position, a pivoted member, a pinion mounted on said pivoted member and normally engaging said driving means and said indicator, a displaceable member associated with said pivoted member and extending into said coin chute whereby a coin striking said displaceable member will displace the same and cause disengagement of said indicator from said pinion to permit said indicator to return to said starting position, means to retain said pivoted member in displaced position until said indicator reaches said starting position, and means to render said driving means inoperative including a braking member associated with said rotatable indicator member and adapted to stop said driving means when said rotatable indicator has been rotated from its starting position to a predetermined displaced position.

4. A coin operated parking meter comprising a supporting structure, an indicator hand adapted for movement between two extreme positions, a wheel on which said hand is mounted, a pivoted member, time responsive driving means, a shaft having a pinion mounted thereon and being driven by said driving means, said pivoted member being journaled on said shaft, a second pinion journaled on said pivoted member and engaging said first mentioned pinion, a third pinion associated with said second pinion and adapted to engage said wheel, resilient means associated with said pivoted member to maintain said third pinion in engagement with said wheel, means to displace said pivoted member to disengage said third pinion from said wheel, means to maintain said pivoted member in displaced position, means to rotate said wheel and said indicator hand to one of said extreme positions and stop means for defining said extreme position and for causing release of said pivoted member from its displaced position so that said wheel and said third pinion may engage each other whereby said indicator hand will be driven by said time responsive driving means to the other of its extreme positions.

5. A timing mechanism comprising a primary rotatable indicator biased toward starting position, time responsive driving means adapted to drive said indicator from said starting position to a predetermined displaced position, a secondary indicator biased away from said starting position, means to cause concurrent movement of both of said indicators to starting position, a ratchet associated with said secondary indicator, a pawl for cooperation with said ratchet to prevent rotation of said secondary indicator away from starting position, and means associated with said primary rotatable indicator for releasing said pawl from said ratchet at a predetermined point in the path of the movement of said primary rotatable indicator whereby said secondary signal may be displayed at a predetermined time.

6. A coin controlled parking meter comprising a coin chute, a coin receptacle, time responsive driving means, means for causing initiation of the operation of said time responsive driving means, said means including a lever with a projection at one end thereof, said projection extending into said coin chute whereby a coin moving through said chute will actuate said lever, a window in said chute to permit inspection of the last coin actuating said lever, a pivoted member positioned adjacent said window, said pivoted member being provided with three projections extending into said chute and with a counterweight, one projection normally lying in the path of a coin and adapted to be displaced thereby to actuate said pivoted member, the second projection normally lying in the path of a coin and adapted to hold a coin before said window, and adapted upon actuation of said pivoted member to release said coin, and the third projection normally lying outside of the path of a coin and adapted upon actuation to be moved into the path at a point between said first and second projections to detain the actuating coin until said second projection has released said exposed coin and has returned to normal position wherein the actuating coin may be detained and exposed after release by third projection.

7. In a parking meter, the combination with a housing having therein a movable element adapted to traverse a dial and actuated by a clock mechanism, of an operating apparatus including, a rotatable drive gear to which the indicator is secured, a movable element attached to the clock mechanism and adapted to engage the drive gear for connecting and disconnecting the indicator with the clock mechanism, a resetting unit operatively connected with the drive gear of the indicator and being automatically operated to reset the indicator when the movable element is disengaged from the gear to disconnect said indicator from said clock mechanism, a coin chute assembly mounted within the meter and including a coin chute for receiving a coin, an operating means for moving the element to disconnect the indicator from the clock mechanism and to thereby permit the resetting unit to operate to reset the indicator to a starting position, said operating means having a portion extending into the chute to be actuated by a coin passing through the chute, means for holding said operating means in a position disconnecting the indicator and clock mechanism until the resetting operation is complete, and means for releasing the holding means to permit the operating means to return to its original position after the resetting to again connect the clock mechanism with the indicator.

FRANK L. EIDMANN.
GEORGE C. ENGEL.